United States Patent [19]

Landis et al.

[11] Patent Number: 4,996,101
[45] Date of Patent: Feb. 26, 1991

[54] PROCESSIBLE POLYIMIDE BLENDS

[75] Inventors: Abraham L. Landis, Northridge; Kreisler S. Y. Lau, Alhambra, both of Calif.

[73] Assignee: Lockheed Corporation, Calabasas, Calif.

[21] Appl. No.: 229,584

[22] Filed: Aug. 8, 1988

[51] Int. Cl.[5] .................. B32B 27/04; D03D 3/00
[52] U.S. Cl. .................. 428/272; 428/367; 428/392; 428/408; 428/473.5; 525/421; 525/426; 525/432; 525/903
[58] Field of Search .............. 525/426, 432, 421, 903; 428/272, 392, 408, 473.5

[56] References Cited

U.S. PATENT DOCUMENTS

| | | | |
|---|---|---|---|
| 4,613,637 | 9/1986 | Landis et al. | 524/105 |
| 4,695,610 | 9/1987 | Egli | 525/426 |
| 4,847,333 | 7/1989 | Lubowitz et al. | 525/432 |
| 4,851,495 | 7/1989 | Sheppard et al. | 528/170 |

*Primary Examiner*—Ana L. Carrillo
*Attorney, Agent, or Firm*—Max Geldin

[57] ABSTRACT

Semi-interpenetrating polymer networks having improved processability and compatibility are prepared by combining a linear polymer comprised of a thermoplastic polyisoimide and a short chain thermosetting polymer in the form of a cross-linkable oligomer comprised of a thermosetting imide or isoimide oligomer containing unsaturated terminal groups, e.g., an acetylene-, a maleimide-, a nadimide- or a benzocyclobutene-terminated imide or isoimide oligomer. In the resulting blend at least one of the diamine and dianhydride moieties of the structural backbone unit of the polyisoimide and of the cross-linkable oligomer are the same, and preferably both of the components of the blend have the same structural backbone unit. An example of a preferred semi-interpenetrating polymer network is the combination of (1) the polyisoimide produced by reaction of benzophenonetetracarboxylic dianhydride (BTDA) with 1,3-bis (3-amino-phenoxy)benzene (APB) to form the polyamic acid precursor, followed by cyclodehydration thereof, and (2) the acetylene-terminated isoimide oligomer containing BTDA-APB backbone units and marketed as Thermid IP-600 by National Starch Company. Upon curing such semi-interpenetrating network or blend, a polymer having high toughness and high modulus is obtained.

39 Claims, No Drawings

PROCESSIBLE POLYIMIDE BLENDS

BACKGROUND OF THE INVENTION

This invention relates to semi-interpenetrating polymer networks (semi-IPNs) made from a combination of a thermoplastic linear polymer with a short chain thermosetting polymer The invention is more particularly concerned with the provision of a semi-IPN system from the interpenetration of (1) a linear polyimide and (2) an imide oligomer containing unsaturated terminal groups, especially an acetylene-terminated polyimide oligomer, both of which have been initially prepared as the corresponding isoimides. The invention also is directed to a method for achieving such semi-IPN system.

A single polymeric material suitable as a matrix resin for the fabrication of composites that has both toughness and good compressive modulus has not been found. Polymeric matrix resins that have good compressive modulus generally possess high cross-link density which imparts brittleness. The consequent lack of flexibility and toughness renders composites formed of such matrix resins highly susceptible to internal damage due to low velocity impact. On the other hand, tough resins have poor processibility because of their very high melt viscosity at the processing temperature. Because of this high viscosity, tows which are made of very fine fibers (5–7 microns) are poorly impregnated with such resins. Thus, linear aromatic polyimides generally are intractable and have high melt viscosities if they exhibit thermoplasticity at all. One solution is to use blends, namely, blending a resin which has good toughness with one which has good compressive strength However, resin compatibility is a problem.

The method generally used to blend an intractable polyimide with a thermosetting resin is to use the polyamic acid precursor of the polyimide. However, this has the disadvantage that the blend then generates volatiles from the cyclodehydration of the polyamic acid during cure.

Interpenetrating polymer networks (IPNs) are defined as multicomponent resin systems formed by blending of the corresponding monomers of two cross-linking polymers, each of which undergoes cross-linking in the presence of, but independent of, the other If one of the polymer components is linear and the other is cross-linked, the result is a semi-IPN Selection of the appropriate polymer blends technology is dependent on the specific materials requirements. The general concept of polymer blends encompasses polymer alloys in the Karasz-MacKnight sense, interpenetrating polymer networks (IPNs) in the Sperling-Klempner sense, semi-IPNs and non-interactive diluents developed by Dr. T. L. St. Clair (NASA-Langley), and the reactive diluents approach favored by Dr. F. E. Arnold (AFWAL/MLBP Polymer Branch) The polymer blends approaches in materials development appear to offer a significant advantage.

Among the polymer blends technologies, polymer alloys and semi-IPNs are two related and highly promising approaches to provide toughened, high modulus engineering materials suitable for next generation composite and other structural applications. No adequate solution has been offered by current thermoset and thermoplastic resins due to their respective shortcomings The underlining principle of the polymer alloy and semi-IPN technologies is the enhanced qualities that can emerge by judicious blending of polymer components.

It has been found that there is an enhancement in overall properties by the combination of the linear and cross-linked polymer components. This general approach has been used in U.S. Pat. No. 4,695,610, which discloses semi-2-interpenetrating polymer networks (semi-2-IPNs) prepared by combining a linear polyimidesulfone (PIS) with a cross-linking acetylene-terminated polyimidesulfone (AT-PIS). This combination is stated to result in a semi-2-IPN of improved strength, adhesion and processibility.

However, this approach has certain limitations. The imide moiety in the linear polymer chain generally makes the polymer insoluble and only in very special cases are the linear polyimides soluble enough to be useful for the production of semi-IPNs. Where mixtures of the more soluble polyamic precursor of the linear polyimide is employed in place of the linear polyimide per se, with an acetylene-terminated sulfone, during the processing, volatiles are evolved from the cyclodehydration step of the polyamic acid. This severely limits the laminate fabrication process employing such mixtures because water or alcohol is evolved during the cure. To obtain high quality parts, high pressure is required, as well as special methods to dispose of the condensation by-products. It is accordingly difficult to prepare thick sections of composites expediently because the water must diffuse through the polymer matrix during the cure cycle If high pressures are not employed, the resulting composite would have a high void content.

However, the various polymer blends technologies are expected to produce high performance organic polymer materials for the next generation. As mentioned above, the concept of polymer blending allows the flexibility of utilizing various existing thermoplastic and thermosetting polymers through property tailoring The entire spectrum of polymer blending spans from 100% thermosets (epoxies-like IPNs), to semi-IPNs (with varying ratios of thermoplastic and thermosetting components), and finally to polymer alloying of all thermoplastic polymers. Polymer alloys derived from true thermoplastics (binary or multicomponent) are in theory infinitely reformable.

According to the present invention, isoimide technology is employed for the enhancement of polymer processibility. This was demonstrated with the utilization of difficult-to-process polyimides via their corresponding isoimide forms. Semi-IPN polymer blends developed from these isoimides and other thermoplastic or thermosetting resins possess unusual thermal and thermo-oxidative stabilities. Most importantly, there is no volatile-producing chemical reaction inherent in the processing steps.

One object of the present invention is the provision of a semi-interpenetrating polyimide network (semi-IPN) formed of a combination of a thermoplastic linear polymer with a short chain thermosetting oligomer, resulting in a two-component resin which has better thermomechanical properties than the respective resins made from the individual components.

Another object is the provision of a semi-IPN system from the interpenetration of a linear polyimide and an acetylene-terminated polyimide oligomer, by procedure whereby both of the components are rendered readily processible prior to curing.

Another object is the provision of a semi-IPN system from the interpenetration of a linear polyimide and a maleimide-terminated, nadimide-terminated, or benzocyclobutene-terminated polyimide oligomer, by procedure whereby both of the components are rendered readily processible prior to curing.

Another object is the provision of an improved semi-IPN system of the above type which avoids formation of volatiles and undesired by-products during cure and does not require the imposition of high pressure during curing of composites made from such semi-IPN system.

A still further object of the invention is the provision of matrix resin having good thermomechanical properties in the 450°-600° F. temperature range and is formed from components having better processibility than present state-of-the-art materials.

Yet another object is to provide a two component resin system which upon curing has toughness and good compressive modulus.

A still further object is the provision of procedure for preparation of the above-noted improved semi-interpenetrating polymer systems.

SUMMARY OF THE INVENTION

The above objects and advantages of the invention are achieved by initially combining and blending a thermoplastic linear polymer having isoimide groups together with a short chain thermosetting polymer containing imide or isoimide groups, and having unsaturated terminal groups capable of curing by homopolymerization.

More particularly, the invention comprises blending a linear polymer in the form of a thermoplastic polyisoimide, with a short chain thermosetting imide or isoimide polymer or oligomer having unsaturated terminal groups, e.g., in the form of an acetylene-terminated, a maleimide-terminated, nadimide-terminated or benzocyclobutene-terminated imide or isoimide oligomer, to form a processible resin mixture and subsequently curing the mixture without evolution of volatiles to form a high-performance semi-IPN.

The invention provides a method of making a semi-interpenetrating polyimide network wherein a linear polymer is combined with a cross-linkable oligomer and wherein the linear polymer comprises a thermoplastic polyisoimide and the cross-linkable oligomer can comprise, e.g., a thermosetting acetylene-terminated oligomer, a maleimide-terminated oligomer, or a nadimide-terminated oligomer, preferably in the form of an isoimide, and the mixture is cured. During cure, the isoimide structural units undergo isomerization to the imide form, along with the homopolymerization of the unsaturated, e.g., acetylene, moieties of the oligomer. The isoimide route allows the blend to be processible, whereas the analogous imide route would yield an unprocessible system.

It has been found that where at least one of the diamine and dianhydride moieties of the structural backbone unit of the thermoplastic polyisoimide and of the thermosetting oligomer are the same, the properties of the blend can be varied or tailored as desired, and particularly, it has been found that when both the linear polyisoimide and the thermosetting oligomer have the same structural backbone unit, the problem of incompatibility of the two components which causes phase separation is avoided.

According to a preferred embodiment, the high molecular weight linear isoimide is made by the reaction of the benzophenonetetracarboxylic dianhydride (BTDA) with 1,3-bis(3-aminophenoxy)benzene (APB) to (1) form the polyamic acid precursor, and (2) cyclodehydration of such precursor by means of N,N'-dicyclohexylcarbodiimide (DCC) to the polyisoimide.

The isoimide form of poly(BTDA/APB)imide is soluble in a number of solvents, such as tetrahydrofuran (THF). The thermosetting constituent of the preferred blend is an acetylene-terminated isoimide oligomer (commercially available as Thermid IP-600 from National Starch and Chemical Company) This oligomer has the same APB and BTDA backbone structural units which also constitute the high molecular weight (HMW) linear polyisoimide component, as noted in greater detail below, and the two components are completely compatible.

Upon curing the above miscible polymer blend, as by heating, the linear polyisoimide converts irreversibly to the imide while being imbibed in a cross-linked network formed by homopolymerization of the thermosetting, acetylene-terminated isoimide oligomer Since one of the components is linear and the other is cross-linked, the cured resin is a semi-IPN polyimide network. It is homogeneous with no phase separation and has overall enhanced thermomechanical properties, such as compressive modulus and toughness.

DETAILED DESCRIPTION OF THE INVENTION AND PREFERRED EMBODIMENTS

An improved semi-interpenetrating polyimide network is provided according to the invention by combining and mixing a linear polyisoimide with a short chain thermosetting polymer or oligomer which can be an imide or isoimide and having unsaturated terminal groups capable of undergoing homopolymerization during curing More particularly, a linear polyisoimide is blended and mixed with, for example, an acetylene- or maleimide- or nadimide-terminated isoimide or imide oligomer, wherein at least a portion of the structural backbone unit of the linear polyisoimide and of the acetylene-, maleimide- or nadimide-terminated isoimide or imide oligomer are the same. Each of these components is allowed to cure in the presence of the other, as by heating, to convert both the linear polyisoimide and the acetylene- or maleimide- or nadimide-terminated isoimide or imide oligomer, to polyimides, and to homopolymerize the unsaturated terminal groups of the oligomer.

Linear Polyisoimide Component

According to a preferred embodiment, high-molecular weight linear polyisoimides are derived from the reactions of benzophenonetetracarboxylic dianhydride (BTDA), or 2,2-bis(3,4-dicarboxyphenyl)hexafluoropropane dianhydride (6FDA), or mixtures of these anhydrides, with 1,3-bis(3-aminophenoxy)benzene (APB). The reactions initially form the amic acid precursors, followed by cyclodehydration of such precursors by means of N,N'-dicyclohexylcarbodiimide (DCC) to yield polyisoimides.

Benzophenonetetracarboxylic dianhydride (BTDA) is reacted with 1,3-bis(3-aminophenoxy)benzene (APB) in a suitable solvent, such as tetrahydrofuran (THF), N-methyl-pyrrolidone (NMP), and glymes, such as digylme to form the polyamic acid precursor, and cyclodehydrating the polyamic acid by means of N,N'-dicyclohexylcarbodiimide (DCC) to the polyisoimide.

The reaction is illustrated by the following reaction scheme:

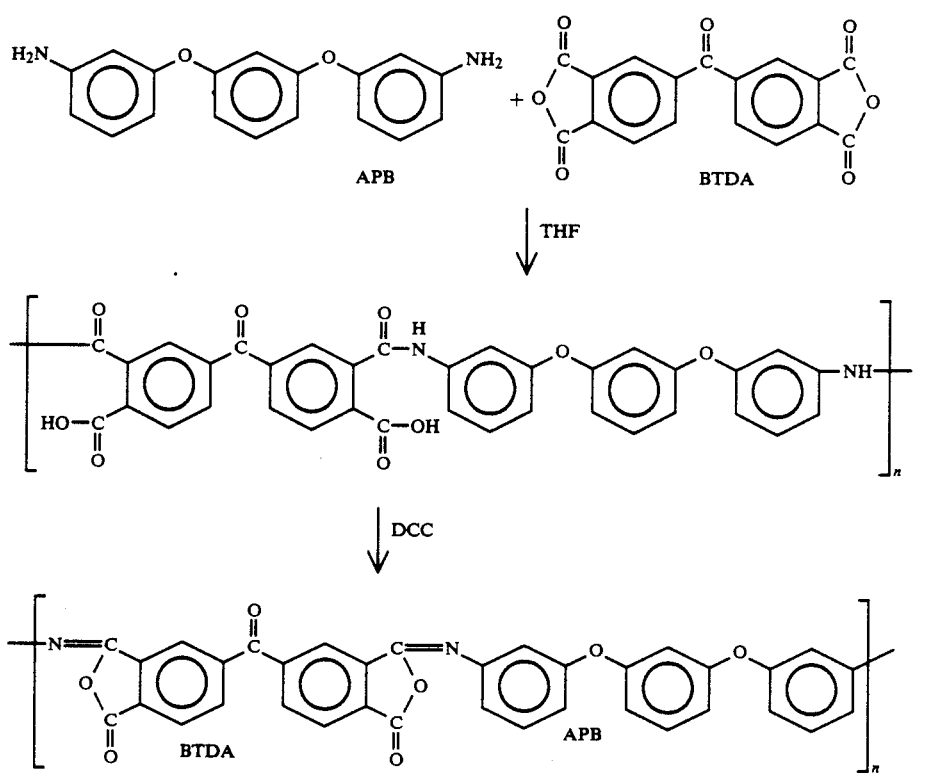

where n ranges from about 30 to about 400, the higher values of n being necessary to obtain toughness and elongation in the polymer.

The reaction mixture is then filtered to remove the by-product dicyclohexylurea, followed by precipitation of the polyisoimide from the solvent solution, e.g., with isopropyl alcohol.

Different types of the linear polyisoimide components can be utilized in the polymer blends in order to vary the properties of the resulting semi-interpenetrating networks Thus, different anhydride monomers in addition to BTDA can be used for reaction with APB, such as pyromellitic dianhydride (PMDA) and 6FDA having the structural formulae:

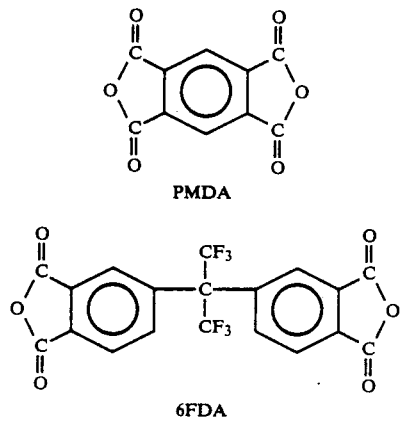

Alternatively, various diamines can be used for reaction with the dianhydride, such as oxydianiline (ODA) in place of APB, and reacting the oxydianiline, for example, with BTDA.

However, the polyisoimide prepared by reacting APB and BTDA is preferred for combining with the thermoset component, e.g., the acetylene-terminated isoimide oligomer, since it presents the least problems in polymer synthesis and subsequent chemical compatibility with the thermoset component.

It is not necessary that the thermoplastic linear polymer chain contain all isoimide units to impart solvent solubility to the polymer, but sufficient isoimide moieties must be present to render the polymer soluble Thus, as little as 5-10% of isoimides in a linear polyimide chain imparts substantial solvent solubility to the material. Hence, it is not necessary to have 100% conversion of the polyamic acid to the polyisoimide during cyclodehydration of the polyamic acid. The amount of isoimide formed during such dehydration depends on the temperature of reaction. At 0° C. to ambient, a high percentage of isoimide units in the polyisoimide is formed, e.g., 90-100%, and at ambient temperature to about 40°-50° C., a lower conversion to isoimide is obtained, e.g., 50% isoimide and 50% imide units in the polyisoimide. Hence, the term "polyisoimide" in relation to the thermoplastic linear polyisoimide component of the invention blend is meant to denote a polyisoimide containing all isoimide units or a polyisoimide containing mixed isoimide and imide units, e.g., as little as 10% isoimide units and the remainder imide units. However, it is preferred to utilize a thermoplastic linear polyisoimide having a major proportion of isoimide units for greater solubility.

Thermosetting Component

As previously noted, the thermosetting component of the invention blend is a short chain polymer or oligomer containing imide or isoimide groups and having unsaturated terminal groups capable of curing by homopolymerization. Although the thermosetting component of the semi-IPN blend may or may not have isoimide groups, the presence of isoimide functions improves polymer solubility.

Where the thermosetting polymer or oligomer having unsaturated terminal groups contains only imide groups, due to solubility problems, the number of repeating imide units can range from about 1 to about 3, for production of useful blends. However, with three repeating units, the solubility of the thermosetting polymer, e.g., in N-methylpyrrolidone (NMP) or dimethylacetamide (DMAC), drops substantially. The use of fluorinated dianhydrides, such as 6FDA in preparing the thermosetting component, as described in greater detail below, permits an increase in the number of such imide groups, since the fluorine atoms of such anhydride greatly aids in imparting solubility to the polymer. Where the thermosetting polymer contains only isoimide groups, the number of repeating isoimide groups can range from about 1 to about 10, preferably about 1 to about 4. The thermosetting polymer can also contain a mixture of imide and isoimide groups.

The synthesis of the short chain thermosetting polymer containing imide groups, isoimide groups, or both, and unsaturated terminal groups, follows the same general reactions as for the thermoplastic linear polyisoimide.

Thus, the synthesis of the preferred acetylene-terminated isoimide oligomers follows the same general technique as for the preparation of the above thermoplastic linear polyisoimide of formula I, except for the addition of a controlled percentage of aminophenylacetylene (APA). The thermoset component of this type is commercially available under the Thermid IP-600 trademark series of acetylene-terminated isoimide or imide oligomers marketed by National Starch Corporation. This family of isoimide oligomers has a BTDA-APB backbone structure as follows:

II
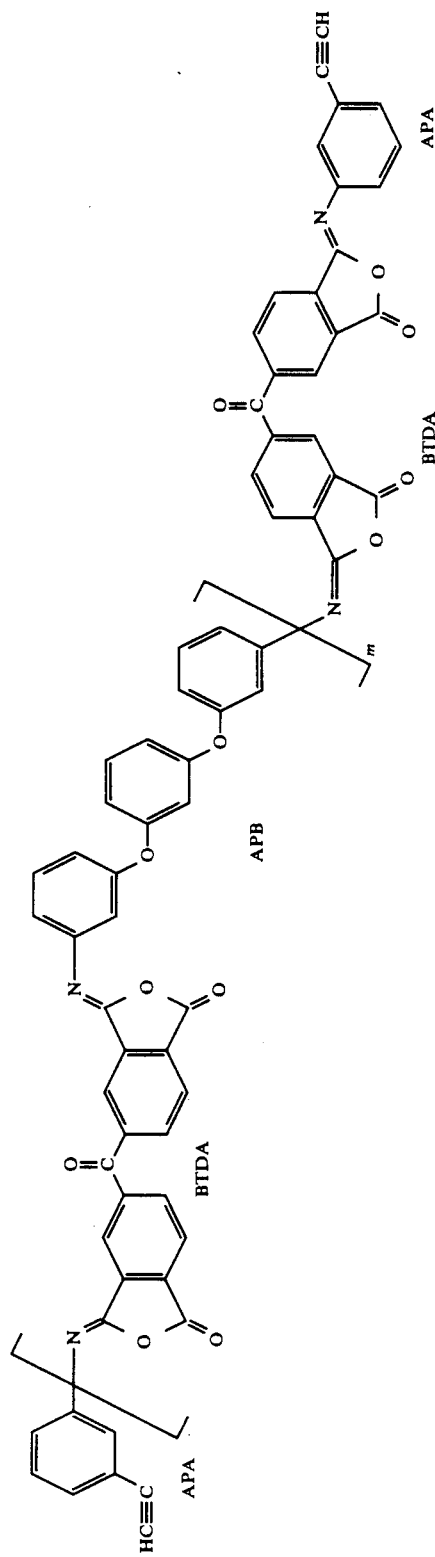

where m is an integer of from 1 to about 10, preferably 1 to about 4.

Bis(ethynyl) isoimides from the reactions of aminophenylacetylene (APA) with BTDA or 6FDA are also useful as the thermoset component of semi-IPNs. Thus, for example, a carboxylic acid dianhydride, such as BTDA, can be reacted with aminophenylacetylene (APA) in a molar proportion of 2 mols of the APA with 1 mole of BTDA, followed by cyclodehydration of the polyamic acid with DCC to produce the acetylene-terminated APA-BTDA-APA isoimide according to the following reaction scheme:

If the above reaction is carried out in a solvent, such as N-methylpyrrolidone (NMP), to the amic acid stage and then dehydrated to the imide through azeotropic removal of water, an imide shown by the formula below is formed:

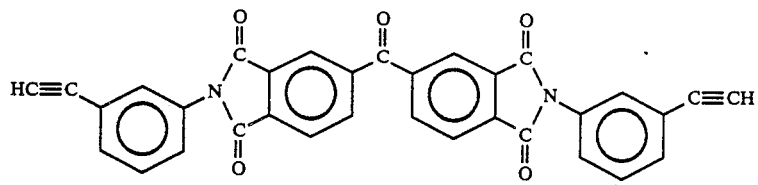

The imide has low solubility in THF whereas the isoimide is very soluble in THF. The imide melts at 321° C. with instant homopolymerization at the melting point whereas the isoimide melts at 124° C. and must be heated to about 220° C. before homopolymerization takes place.

In contrast to the Thermid 600 isoimide oligomers represented by formula II above, the imide form is shown by the structure below:

III

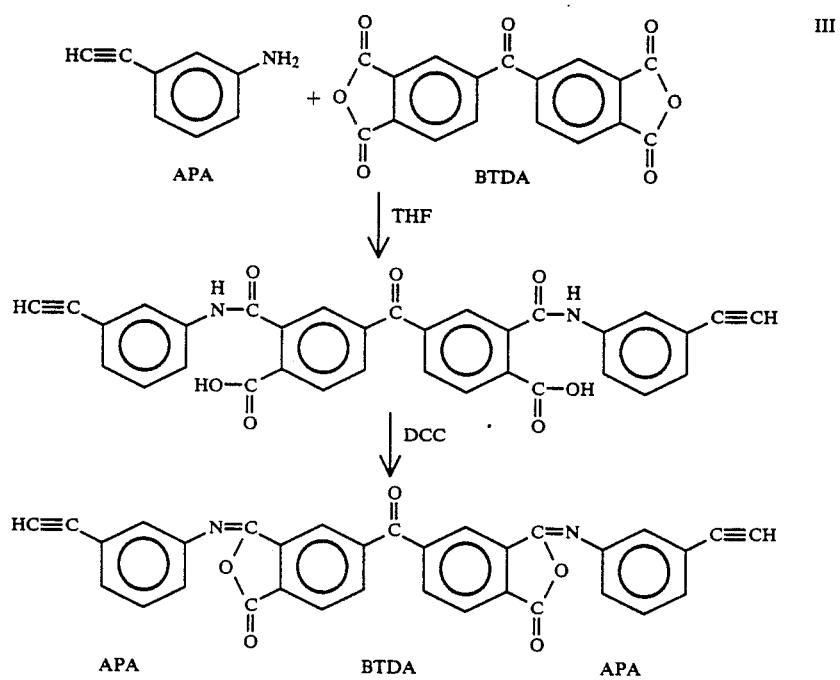

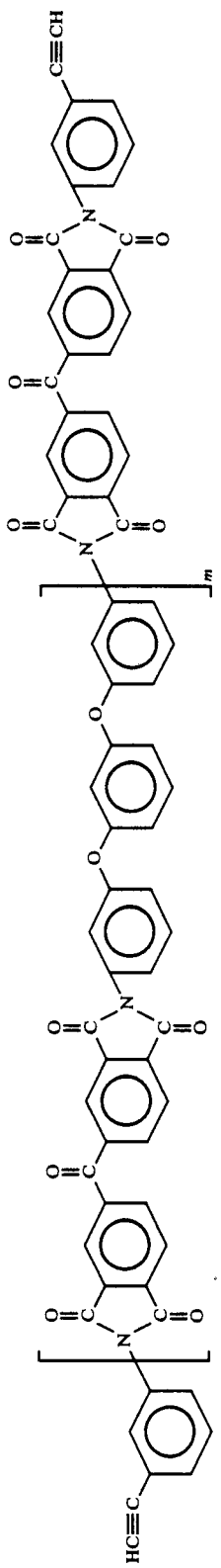

where m has the values noted above.

The acetylene terminated imide, Thermid 600 series, is soluble in NMP but not in THF. Also, when m is greater than 3, the solubility of the imide is very low in NMP where, for the isoimide of formula II, the solubility in THF is great for all values of m, up to about 10. Similarly, the linear polyimide formed from BTDA and APB is not soluble in NMP or THF, whereas the isoimide of formula I above is extremely soluble in both of these solvents. The isoimide isomerizes to the imide upon heat (150°-250° C.) to form the imide. Infrared spectra of the cured isoimide is identical to the imide.

In the above reactions for producing the polyamic acid precursor, the reactions are carried out in a suitable solvent, such as THF, N,N'dimethylacetamide (DMAC), N-methyl-pyrrolidone (NMP) and glymes (glycol dimethyl ethers), such as diglyme. The temperature of the reaction can be about room temperature, or below, or above, and the time of reaction can range from about 1 to about 24 hours. The cyclodehydration reaction in each of the above cases is carried out by using about 2 mols of DCC to 1 mol of the acid anhydride portion of the molecule. The temperature of the reaction can range from room temperature or below, e.g., 10° C., and the time of reaction can range from about 1 to about 24 hours.

It is seen that at least one of the moieties of the structural backbone unit of the polyisoimide and the oligomer having unsaturated end groups is the same. Thus, at least one of the moieties of the structural backbone unit of the BTDA-APB polyisoimide of formula I, namely, BTDA, is present in the above APA-BTDA-APA acetylene-terminated isoimide of formula III. It is particularly noted that the polyisoimide BTDA-APB I has the same skeletal structure as the BTDA-APB structural backbone unit of the Thermid IP-600 acetylene-terminated isoimide oligomer II. Since both the linear polyisoimide and the acetylene-terminated isoimide oligomer have a similar or the same structural backbone, as noted above, this reduces the problem of incompatibility because of phase separation. Studies have shown that if both the thermoplastic and thermosetting components have similar structural constituents, miscibility can be achieved. It is important that phase separation does not take place in order to obtain an interpenetrating polymer network and, therefore, enhancement of the thermomechanical properties.

In addition to acetylene-terminated imide or isoimide oligomers, other useful thermoset imide or isoimide oligomers include the maleimide-terminated and nadimide-terminated imide or isoimide oligomers. Still other thermoset imide or isoimide oligomers are those having benzocyclobutene end groups The commonality among all these reactive oligomers is that they undergo addition-type cure. Specific examples of BTDA-APB imide oligomers of these types which can be employed are as follows:

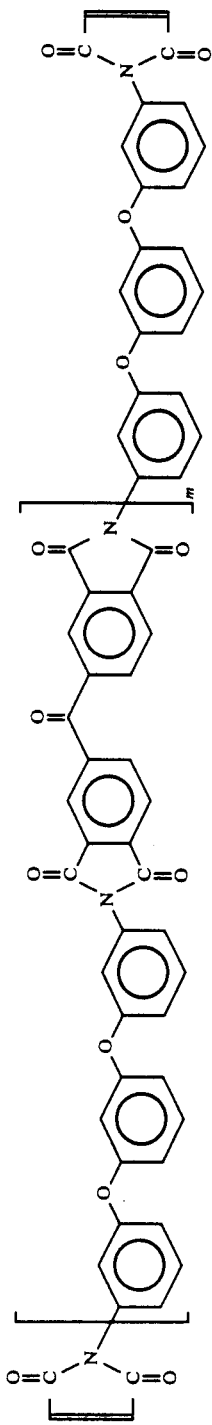
bis maleimide oligomer
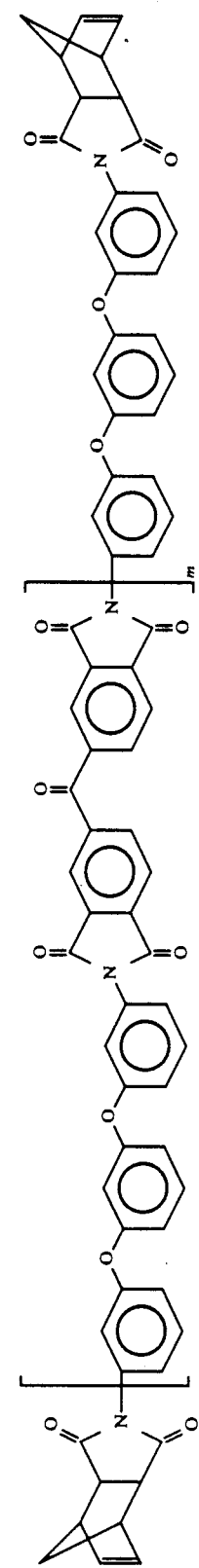
bisnadimide oligomer
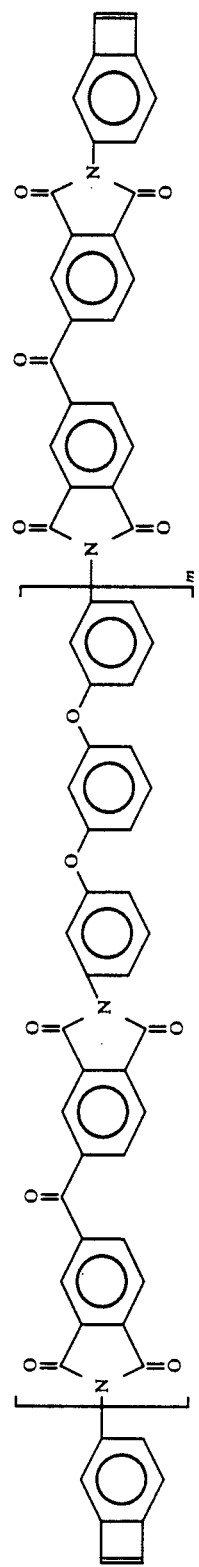
Benzocyclobutene-terminated oligomer where m has the values noted above, preferably 1 to about 4.

Isoimide oligomers corresponding to the imides of formulae IV, V and VI are particularly useful.

Thus, the thermoset imide or isoimide oligomer can have unsaturated terminal groups comprising acetylenic groups as exemplified by formulae II and III above, or comprising ethylenic groups as exemplified by formulae IV, V and VI above.

The two components, the thermoplastic polyisoimide, and the thermosetting imide or isoimide oligomer, e.g., acetylene-terminated isoimide oligomer, are blended together in a suitable solvent, such as THF or DMAC. The two components can be blended together in a proportion of 10–90% of the polyisoimide and 90–10% of the thermosetting, e.g., acetylene-terminated, oligomer, by weight. Preferably, these two components are blended together in a proportion of about 25 to about 75% of the polyisoimide and about 75 to about 25% of the thermosetting, e.g., acetylene-terminated isoimide, oligomer, by weight. A particularly preferred blend has been found to be a 50—50 mixture, by weight, of the two components. The solution can be used to prepare "prepregs" or the polymer blend can be precipitated by adding the solution of the polymers to a non-solvent, such as isopropyl alcohol, followed by filtering the precipitated solid and drying.

The blend or mixture of the polyisoimide and the thermosetting imide or isoimide oligomer, e.g., acetylene-terminated isoimide oligomer, is heated to cure the blend and form the semi-IPN When using a blend of BTDA-APB polyisoimide and Thermid IP-600, upon heating the blend, the material tends to soften, first, e.g., at a temperature of about 185° C., and at a temperature of about 250° C. cures to a tough resinous material A final cure to a temperature of about 300° C. is desirous to maximize the thermomechanical properties. During the curing process, the polyisoimide converts irreversibly to the polyimide, and the thermosetting imide or isoimide oligomer, e.g., acetylene-terminated imide oligomer forms a semi-IPN by homopolymerization of the unsaturated, e.g., acetylene, terminal groups, to form ene-yne and benzenoid structures, both processes taking place simultaneously. The polymerization mechanism using an acetylene-terminated imide or isoimide oligomer is schematically shown below:

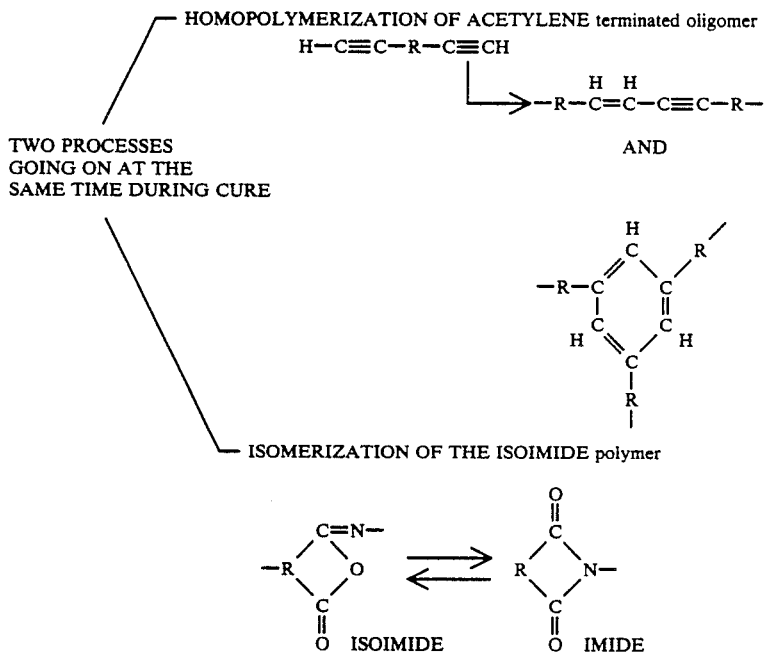

Practical Applications

The semi-interpenetrating network polymer blends obtained according to the invention are useful as matrix resins in composites and laminates, as high-temperature adhesive, and can be processed as films. For adhesives applications, the uncured resin, which comprises a polymer blend of the thermoset component and the linear polymer, is dissolved in a suitable solvent or combination of solvents, such as N-methyl-pyrrolidone (NMP). The amount of resinous solids can vary, depending on solubility and viscosity characteristics, an amount of up to 50% resin solids being suitable, with 5 to 40% being generally appropriate. After application of the adhesive composition, solvent is removed by drying, and the adhesive cured. Composites are made by impregnating conventional fabrics, such as woven graphite fiber, or fabric tows, with a solution of the curable semi-IPN polymer blend in a solvent followed by removal of solvent and curing, usually under pressure. The solvents may be the same as those suitable for preparing adhesives. The amount of resin solids in the solution will be generally lower than used as an adhesive because it is usually desirable to have a relatively low viscosity for penetration into the fabric to achieve complete impregnation. A resin solids content of up to about 35% by weight is generally suitable, with about 5 to about 25% usually appropriate. Semi-IPN polymer composites formed utilizing polyisoimide blends comprising curable isoimide polymer and acetylene-terminated isoimide oligomers according to the invention are particularly useful in the aircraft industry. Films can be made from polymer solutions of the above polymer blend in any convenient manner, such as by solution casting Solvent is removed from the cast film, and the film cured at appropriate curing temperatures of, for example, 225° to about 300° C.

The following are examples of practice of the invention:

EXAMPLE 1

Synthesis of Poly(BTDA-APB) Isoimide:

A five-liter three-neck round-bottom flask was fitted with a Tru-bore stirrer, dropping funnel, reflux condenser, constant pressure argon inlet fitting and a heating mentle. The flask was charged with benzophenonetetracarboxylic dianhydride (200.0 grams, 0.6211 mole, recrystallized from acetic anhydride) and anhydrous tetrahydrofuran (1.5 liter). The mixture was warmed to just below the reflux temperature and the heating source shut off. A solution of 1,3-bis(3-aminophenoxy)-benzene (181.4 grams, 0.6211 mole, recrystallized from toluene) in anhydrous tetrahydrofuran (1 liter) was added dropwise under an argon atmosphere over a 45-minute period.

The reaction mixture was stirred at room temperature for 2.5 hours, and then a solution of N,N'-dicyclohexylcarbodiimide (255.9 grams, 1.24 moles) in anhydrous tetrahydrofuran (800 milliliters) was added dropwise over a 1.75-hour period. The slow addition is necessary to prevent gelation. During the course of the addition, the viscosity of the mixture increased. After the addition, the reaction mixture was stirred for 16 hours. The reaction mixture was filtered to remove the dicyclohexylurea and the precipitate was washed with fresh tetrahydrofuran and combined with the filtrate.

The filtrate was concentrated to about 1.2 liters on the rotary evaporator. The yellow polyisoimide was precipitated by adding about 200 milliliters of the filtrate to about 500 milliliters of isopropyl alcohol in a blender. The process was repeated until all the filtrate was treated in this fashion. After isolating the product by filtration, the product was dried in a vacuum oven at 40° C. A yield of 350 grams was obtained. The products made in this manner were found to have intrinsic viscosities of 0.52–0.62 in tetrahydrofuran and a Tg of 174° C., as determined by differential scanning calorimetry.

EXAMPLE 2

Synthesis of APA-BTDA-APA Acetylene Terminated Isoimide Oligomer

A five-liter, three-neck flask was fitted with a Tru-bore stirrer, dropping funnel and reflux condenser. Argon was passed through the flask. The flask was charged with benzophenonetetracarboxylic dianhydride (322.0 g, 1.000 mol) and tetrahydrofuran (1.5 liters). To the slurry, 3-aminophenylacetylene (234.0 g, 2.000 mol) was added dropwise. All of the BTDA went into solution. Then an additional liter of tetrahydrofuran was added, and the reaction mixture was stirred at ambient temperature for 1 hour.

A solution of N,N'-dicyclohexylcarbodiimide (412.0 grams, 2.000 moles) in anhydrous tetrahydrofuran (400 milliliters) was added dropwise over a 30-minutes period. The mixture was then stirred for 2 hours, filtered to remove the dicyclohexylurea, and the filtrate concentrated to about 2.2 liters. The product was isolated by precipitation in isopropyl alcohol by adding one part of the tetrahydrofuran solution to about three parts of isopropyl alcohol and filtering. The yellow product was then air dried in a shallow pan and finally vacuum dried at 40° C. A yield of 20 grams was obtained The product has a melting range of 18°–124° C., and cured to a brittle solid when heated on the Fisher-Jones melting point apparatus. The product was very soluble in acetone or tetrahydrofuran.

EXAMPLE 3

A 50/50 blend mixture by weight of BTDA-APB polyisoimide and APA-BTDA-APA acetylene-terminated isoimide oligomer is dissolved in tetrahydrofuran and is cast into a film and cured at a temperature up to 300° C. A tough homogeneous cured resin with no phase separation is produced.

EXAMPLE 4

A typical preparation of a blend of polyisoimide and acetylene-terminated isoimide oligomer and the curing thereof to form a semi-IPN network is set forth below:

A two-liter three-necked flask was fitted with a Tru-bore stirrer, Claisen adapter with an argon (constant pressure) inlet and thermometer positioned to read the pot temperature. The flask was charged with 1,3-bis (3-aminophenoxy)benzene (70.0 grams, 0.2397 mole) and dry DMAC (70 ml). To the solution, under a stream of argon, benzophenonetetracarboxylic dianhydride (77.1 gms, 0.2397 mole) was added portion by portion over a 30-minute period. During the addition, the temperature rose 10° C. An additional 0.5 gms of benzophenonetetracarboxylic dianhydride was added. The viscous solution was stirred overnight under argon.

An additional 175 ml of DMAC was added to dilute the solution, and a solution of N,N'-dicyclohexylcarbodiimide (100 gms, 0.4854 mole) in dry DMAC (350 ml) was added over a 30-minute period. After stirring for several hours, the dicyclohexylurea formed was removed by filtration. The reaction mixture was concentrated to 600 ml on the rotary film evaporator, allowed to stand for about 16 hours, and filtered to remove a small amount of additional dicyclohexylurea (less than 1 gm).

To the filtrate, a solution of 140 gms of Thermid IP-600 in 300 ml of DMAC was added. The product was isolated by precipitation in dry isopropanol, air dried, and finally vacuum dried at 60° C. A yield of 266 grams of a light yellow fluffy powder forming the blend was obtained. The oligomer started to soften at 185° C., became quite fluid by 220° C., and at 250° C. polymerized to a tough resinous material.

EXAMPLE 5

Further illustrating the processibility of semi-IPNs according to the invention, a 50/50 blend mixture of Thermid IP-600 and poly(BTDA-APB) isoimide is very soluble in tetrahydrofuran and is amenable to autoclave processing. Rheometrics dynamic analysis of the 50/50 blend mixture indicated a melt viscosity value intermediate between those of the thermoplastic poly (BTDA-APB) isoimide and Thermid IP-600. This level of melt viscosity provides enough flow to thoroughly impregnate the fibers of graphite-epoxy fabric layers during laminate fabrication and obtain good consolidation at moderate pressure. At the same time, excessive bleed-out is avoided. The presence of the thermoplastic polyisoimide component reduces the rate of homopolymerization of the acetylene end groups of Thermid IP-600 and thereby increases the gel time. This results in a wider processing window relative to Thermid IP-600 by itself.

Thermogravimetric decomposition temperature tests showed that the 50/50 blend mixture of the Thermid IP-600 and poly (BTDA-APB) isoimide mixture exhibited an enhancement in thermal stability relative to the individual components as shown by the following table:

TABLE

THERMOGRAVIMETRIC ANALYSIS DATA

| Blend | Decomposition Temperature, °C. | |
|---|---|---|
| | Air | Nitrogen |
| Thermid IP-600 | 588 | 546 |
| BTDA-APB isoimide | 593 | 555 |
| 50/50 of each of the above | 606 | 610 |

EXAMPLE 6

A polyisoimide was synthesized from 6FDA and APB. A 5 liter three-necked flask fitted with a Tru-bore stirrer, pressure equalization addition funnel and constant pressure argon inlet was charged with 6FDA (111.0 gms, 0.250 mole) and dry tetrahydrofuran (800 ml). A solution of 1,3-bis(3-aminophenyoxy)benzene (APB) (73.0 gms, 0.250 mole) in dry tetrahydrofuran (500 ml) was added dropwise under argon with good stirring over a 30 minute period. The solution was stirred for an additional hour. Then, dry tetrahydrofuran (1 liter) was added to dilute the polyamic acid precursor. A solution of N,N'-dicyclohexylcarbodiimide (103.0 gms, 0.500 mole) in dry tetrahydrofuran (200 ml) was added dropwise with good stirring. The addition took several hours. The N,N'-dicyclohexylurea came out as a crystalline solid. The reaction mixture was stirred overnight and filtered The filtrate was concentrated to 1200 ml and the polyisoimide isolated by precipitation in isopropanol. After filtration and drying the yellow powder in vacuum (40°-50° C.), a yield of 168 grams was obtained It was possible to cast tough films of the polymer from dimethylacetamide and curing in an oven with a program temperature from 75° C. to 250° C.

EXAMPLE 7

A polyisoimide was synthesized using a mixture of acid dianhydrides, namely 6FDA and BTDA. A five liter, three-necked flask was fitted with a heating mantle, Tru-bore stirrer, condenser, dropping funnel and an argon constant pressure inlet The flask was charged with 6FDA (60.0 gms, 0.1351 mole), benzophenonetetracarboxylic dianhydride (BTDA) (60.0 gms, 0.1863 mole) and dry tetrahydrofuran (800 ml). The solution was warmed to just below reflux and the heat turned off. A solution of 1,3-bis(3-aminophenyoxy)benzene (APB) (93.9 gms, 0.3215 mole) in dry tetrahydrofuran (500 ml) was added dropwise over a 45 minute period. After stirring the reaction mixture at ambient temperature overnight, a solution of N,N'-dicyclohexylcarbodiimide (DCC) (132.5 gms, 0.6432 mole) in dry tetrahydrofuran (400 ml) was added dropwise. It was necessary to add an additional liter of tetrahydrofuran early during this addition to minimize the polymer from traveling up the stirring shaft. The addition of DCC took two hours. The reaction mixture was stirred overnight at room temperature, filtered and the filtrate concentrated to 1200 ml. The polyisoimide was isolated by precipitation in isopropanol and filtered. The dried polyisoimide weighed 194 grams and could be cast into tough films from DMAC when cured to 250° C.

EXAMPLE 8

This is an example of an acetylene-terminated isoimide from 6FDA and 3-aminophenylacetylene. A 5-liter, three-necked flask was fitted with a Tru-bore stirrer, argon inlet and outlet, and a pressure equalization dropping funnel. The flask was charged with 6FDA (111.0 gms, 0.250 mole) and tetrahydrofuran (750 ml). To the solution, 3-aminophenylacetylene (58.5 gms, 0.500 mole) in tetrahydrofuran (250 ml) was added. The solution was stirred at room temperature for one hour. Then a solution of N,N'-dicyclohexylcarbodiimide (103.6 gms, 0.500 mole) in tetrahydrofuran (500 ml) was added dropwise over a 45 minute period. The reaction mixture was filtered and concentrated to 700 ml. To isolate the product, the concentrate was poured into hexane. It was not possible to use isopropanol as the precipitant because the isoimide is soluble in the THF/IPA mixture. The product was dried at 60° C. in vacuum. A yield of 123 gms with a melting range of 118°-124° C. was obtained. The product cures to a hard resinous mass at 200° C.

EXAMPLE 9

The following is an example of the preparation of a bismaleimide synthesized from the reaction of maleic anhydride (MA) and 1,3-bis(3-aminophenoxy)benzene (APB). A 2-liter, three-necked flask fitted with a heating mantle was charged with maleic anhydride (MA) (98.1 gms, 1.00 mole) and N-methyl-pyrrolidone (NMP) (100 ml). A solution of 1,3-bis(3-aminophenoxy)benzene (APB) (149.0 gms, 0.50 mole) in NMP (400 ml) was added all at once. Then the flask was fitted with a thermometer to read the pot temperature and a Dean-Stark trap and reflux condenser. Sufficient toluene was added so that the pot temperature was 150° C. at reflux. The reaction mixture was heated at reflux overnight. About 22 ml of an aqueous phase was collected. The product was isolated by precipitation in water. The powder after drying in vacuum at 60°-80° C. weighed 192 grams. The product started to melt at 118° C. and was quite fluid at 130° C. and cured to a brittle solid when heated to 300° C.

EXAMPLE 10

The following is an example of the preparation of a nadimide-terminated isoimide from the reaction of 1,3-aminophenoxybenzene (APB), benzophenonetetracarboxylic dianhydride (BTDA) and 5-norbornene-2,3-dicarboxylic anhydride (nadic anhydride) (NA). A 5-liter, three-necked flask fitted with a thermometer, Tru-bore stirrer, and pressure equalization addition funnel was charged with APB (146.0 gms, 0.500 mole) and dry tetrahydrofuran (THF) (1500 ml). Then BTOA (80.5 gms, 0.250 mole) was added portion by portion over a 15 minute period. The temperature rose from 23° C. to 32° C. Then NA (82.0 gms, 0.50 mole) was added all at once. After adding an additional portion of THF (450 ml), the solution was stirred for 30 minutes A solution of N,N'-dicyclohexylcarbodiimide (DCC) (206.0 gms, 1.000 mole) in dry THF (800 ml) was added dropwise over a two hour period. After stirring for 72 hours, the solution was filtered, the filtrate concentrated to 800 ml, and the NA capped polyisoimide isolated by precipitation in isopropanol. The product was filtered and dried at 60° C. in vacuum to yield 255 gms with a melting range of 165°-185° C. The product cured to a brittle solid when heated to 300° C.

EXAMPLE 11

The polyisoimide synthesized from 6FDA and APB described by Example 6 and the bismaleimide synthesized from MA and APB described by Example 9 was blended in a 50/50 ratio by weight and dissolved in dimethylacetamide to a solids content of 20 weight percent. A 6 mil doctor blade was used to draw a film on a glass plate. After curing up to 325° C. in a forced air oven, a film was lifted which was tough and resisted attack by dimethylacetamide.

EXAMPLE 12

The polyisoimide synthesized using a mixture of acid anhydrides, namely, 6FDA and BTDA, with APB described by Example 7 and nadimide-terminated isoimide from the reaction of APB, BTDA and NA described by Example 10 was blended in a 50/50 ratio by weight and dissolved in dimethylacetamide to a solids content of 20 weight percent. A film was cast on a glass plate and cured to 350° C. in a forced air oven, maintaining the 350° C. for one hour. A tough film was lifted off the plate which resisted attack by solvents, such as THF and DMAC, solvents which readily dissolve the MA capped polyisoimide obtained by Example 10.

The uniqueness of the approach according to the present invention is that previously unprocessible linear polymers can now be used in the blending process. Complete miscibility was achieved over a wider variation of the ratio of the thermoplastic and thermosetting components. The wider range of miscibility of the components permits increased tailorability of thermomechanical properties to meet specific requirements of advanced aircraft. The final cured product is indistinguishable from the composition obtained if it were possible to start with the imide forms of the components. The thermoset component having unsaturated terminal end groups and imide or isoimide groups, e.g., the thermosetting acetylene-terminated isoimide oligomer component, of the semi-IPN system functions as a reactive diluent for the linear polyisoimide, thus achieving a lower melt viscosity and a depressed melt temperature of the blend. The excellent solubility of the blend in low-boiling, non-reactive solvents makes it easy to prepare prepregs. The prepregs made from the blends have better handling qualities for layups than those made with the low molecular weight oligomers by themselves. For example, tow separation which occurs when low molecular weight oligomers without occluded solvents are used by themselves, is eliminated. The thermoplastic component functions as a binder by virtue of its film forming ability and, therefore, helps hold the tows together during handling.

The following are the advantages of the present invention: (1) no volatiles formed during curing; (2) enables a wide variety of polyimides to be used as the linear component of a semi-interpenetrating polymer network; (3) no phase separation; (4) permits processing condition to produce well-impregnated matrices; (5) permits "tailor made" thermomechanical properties for the matrix resin; (6) economically viable; (7) has wide application for a number of resin systems.

According to the invention, it is thus seen that via the isoimide route, a difficultly processible polyimide can be made processible by employing a blend of a polyisoimide and an oligomer of an imide or isoimide containing unsaturated terminal groups, particularly acetylene-terminated isoimide oligomer. The polymer blend precursor, because of the unique molecular structure considerations, is both miscible and processible. The resulting blend cures to a semi-interpenetrating polyimide network by addition and isomerization reactions without the evolution of volatile by-products. Such polymers are of particular interest for aircraft and spacecraft applications due to the requirements of weight reduction, high modulus, high toughness and long-term durability for such applications.

While particular embodiments of the invention have been described for purposes of illustration, it will be understood that various changes and modifications within the spirit of the invention can be made, and the invention is not to be taken as limited except by the scope of the appended claims.

What is claimed is:

1. In the process of making a semi-interpenetrating polyimide network wherein a linear polymer is combined and blended with ac ross-linkable oligomer and the resulting blend is cured, the improvement wherein the linear polymer comprises a thermoplastic polyisoimide and the cross-linkable oligomer comprises a thermosetting imide or isoimide oligomer having unsaturated terminal groups.

2. The process of claim 1, wherein at least one of the moieties of the structural backbone unit of tho polyisoimide and of the thermosetting oligomer are the same.

3. The process of claim 1, wherein said polyisoimide and said thermosetting oligomer have the same structural backbone unit.

4. The process of claim 1, wherein said thermoplastic polyisoimide contains imide units.

5. The process of claim 4, wherein said polyisoimide has a major proportion of isoimide units.

6. The process of claim 1, wherein said thermosetting oligomer having unsaturated terminal groups is an isoimide.

7. The process of claim 1, wherein said thermosetting oligomer is selected from the group consisting of acetylene-terminated, maleimide-terminated, nadimide-terminated and benzocyclobutene-terminated imide and isoimide oligomers.

8. The process of claim 7, wherein said thermosetting is an isoimide.

9. The process of claim 1, wherein the polyisoimide has following structural formula:

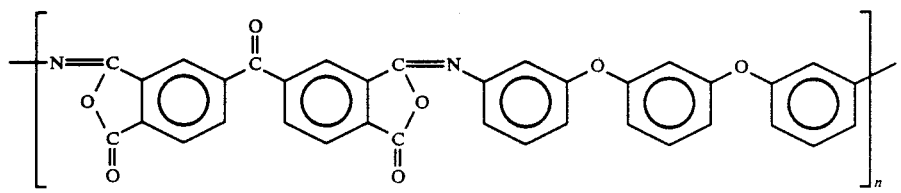

wherein n is an integer of from about 30 to about 400.

10. The process of claim 1, wherein the thermosetting oligomer is an acetylene-terminated isoimide oligomer having the following structural formula:

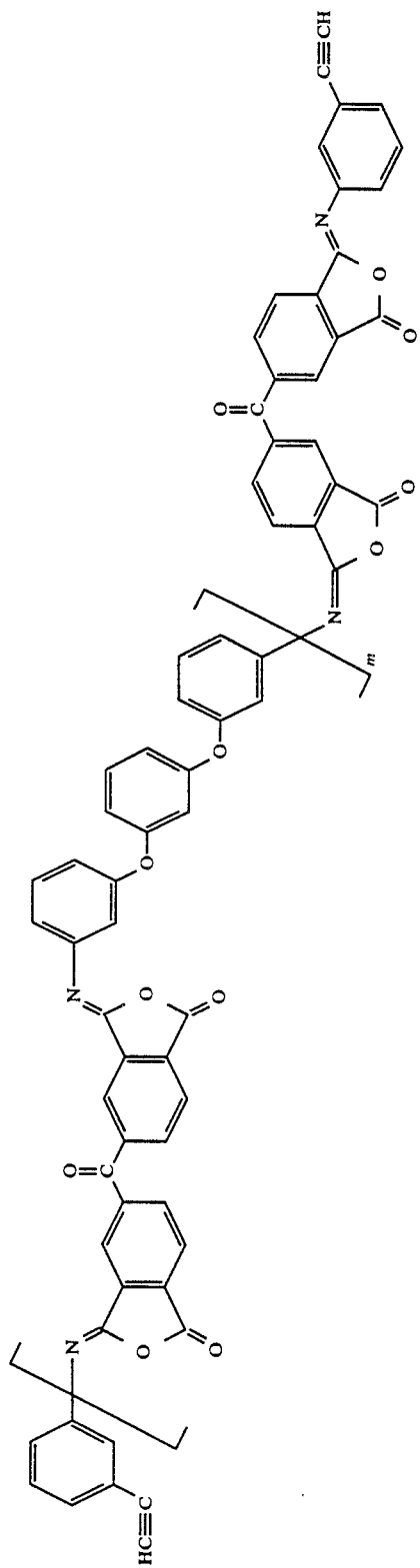

where m is an integer of 1 to about 10.
11. The process of claim 1, wherein the polyisoimide has the following structural formula:
and wherein the thermosetting oligomer is an acetylene-terminated isoimide oligomer having the following structural formula:
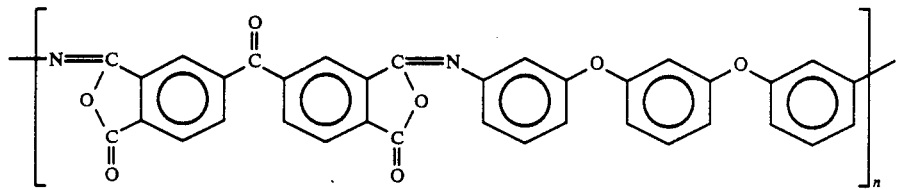
wherein n is an integer of from about 30 to about 400,

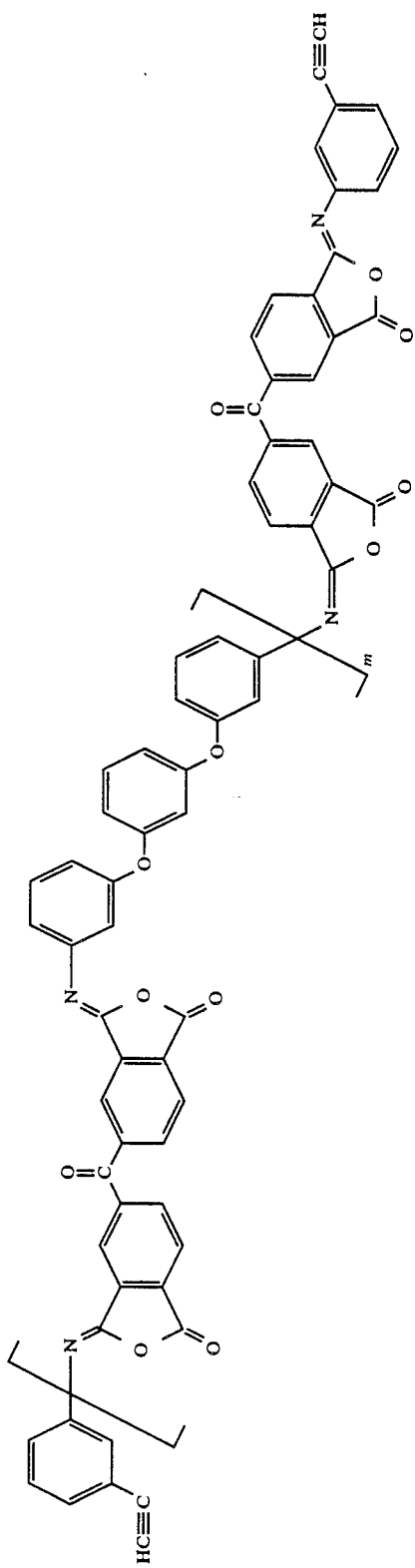

where m is an integer of 1 to about 4.

12. The process of claim 1, wherein the amount of the polyisoimide ranges from about 10 to about 90%, and the amount of the thermosetting oligomer ranges from about 90 to about 10%, by weight.

13. The process of claim 11, wherein the amount of the polyisoimide ranges from about 25 to about 75%, and the amount of the thermosetting oligomer ranges from about 75 to about 25%, by weight.

14. In a semi-interpenetrating polymer network formed by curing a linear polymer combined with a cross-linkable oligomer, each of which is curable in the presence of the other, the improvement wherein the linear polymer comprises a thermoplastic polyisoimide and the cross-linkable oligomer comprises a thermosetting imide or isoimide oligomer having unsaturated terminal groups.

15. The semi-interpenetrating polymer network of claim 14, wherein at least one of the moieties of the structural backbone unit of the polyisoimide and the thermosetting oligomer are the same.

16. The semi-interpenetrating polymer network of claim 14, wherein said polyisoimide and said thermosetting oligomer have the same structural backbone unit.

17. The semi-interpenetrating polymer network of claim 14, wherein said polyisoimide has a major proportion of isoimide units.

18. The semi-interpenetrating polymer network of claim 14, wherein said thermosetting oligomer is an isoimide.

19. The semi-interpenetrating polymer network of claim 17, wherein said thermosetting oligomer is an isoimide.

20. The semi-interpenetrating polymer network of claim 14, wherein the polyisoimide has the following structural formula:

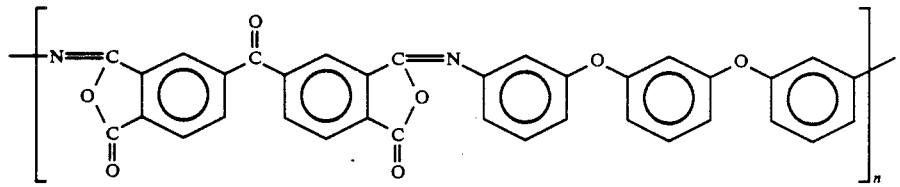

wherein n is an integer of from about 30 to about 400, and wherein the thermosetting oligomer is acetylene-terminated isoimide oligomer having the following structural formula:

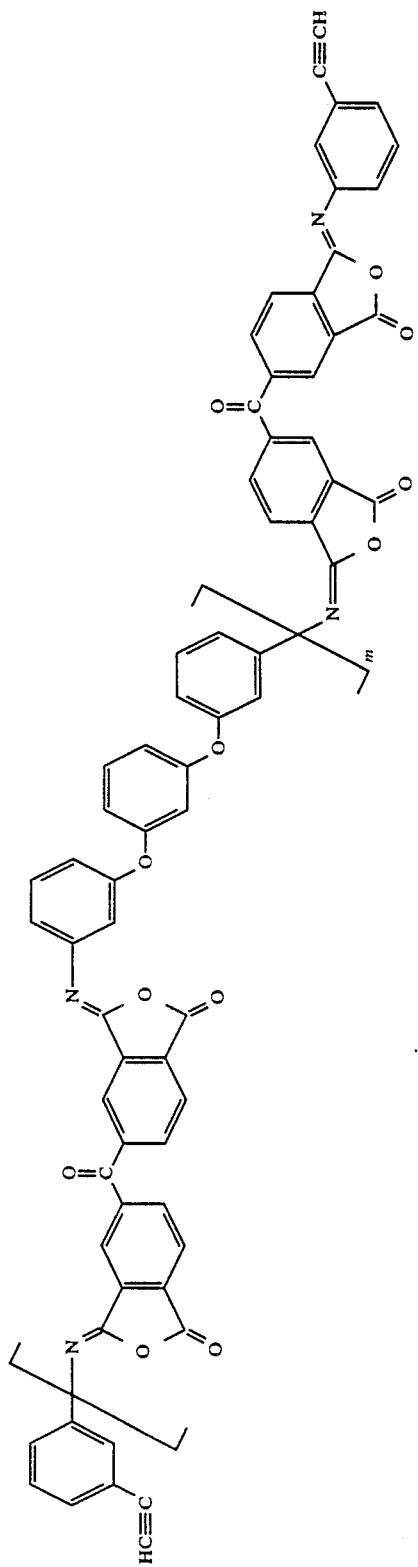

where m is an integer of 1 to about 4.

21. The semi-interpenetrating polymer network of claim 14, wherein the polyisoimide has the following structural formula:

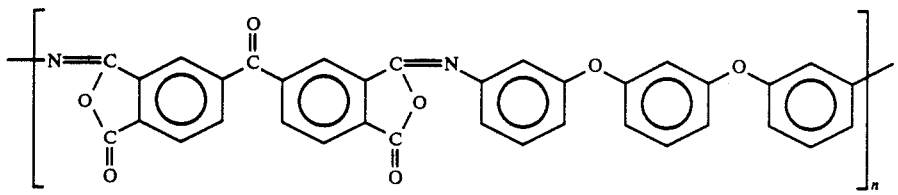

wherein n is an integer of from about 30 to about 400, and wherein the thermosetting oligomer is an acetylene-terminated isoimide oligomer having the following structural formula:

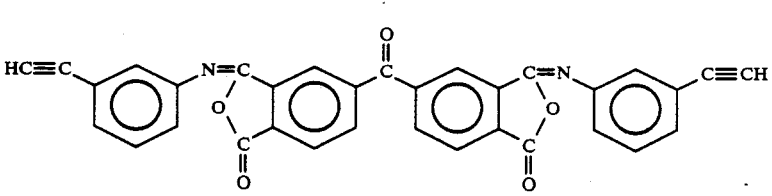

22. The semi-interpenetrating polymer network of claim 14, wherein the amount of the polyisoimide ranges from about 10 to about 90%, and the amount of the thermosetting oligomer ranges from about 90 to about 10%, by weight.

23. The semi-interpenetrating polymer network of claim 14, wherein the amount of the polyisoimide ranges from about 25 to about 75%, and the amount of the thermosetting oligomer ranges from about 75 to about 25%, by weight.

24. The interpenetrating polymer network of claim 20, employing about 50% of said polyisoimide and about 50% of said acetylene-terminated isoimide oligomer, by weight.

25. A two component resin system which upon curing forms a semi-interpenetrating polymer network having toughness and good compressive modulus, which comprises a mixture of effective amounts sufficient to form said polymer network upon curing, of a thermoplastic linear polymer having isoimide groups and a short chain thermosetting imide or isoimide oligomer having unsaturated terminal groups capable of curing by homopolymerization.

26. The resin system of claim 25, wherein said polyisoimide has a major proportion of isoimide units, and wherein said thermosetting oligomer having unsaturated terminal groups is an isoimide.

27. The resin system of claim 25, wherein said thermosetting oligomer is selected from the group consisting of acetylene-terminated, maleimide-terminated, nadimide-terminated and benzocyclobutene-terminated imide and isoimide oligomers.

28. The resin system of claim 25, wherein the amount of the polyisoimide ranges from about 10 to about 90%, and the amount of the thermosetting oligomer ranges from about 90 to about 10%, by weight.

29. The resin system of claim 27, wherein the amount of the polyisoimide ranges from about 25 to about 75%, and the amount of the thermosetting oligomer ranges from about 75 to about 25%, by weight.

30. In a composite comprising resin-impregnated fabric, the improvement wherein said resin comprises a semi-interpenetrating polymer network, said semi-interpenetrating polymer network formed by curing a linear polymer combined with a cross-linkable oligomer, wherein said linear polymer comprises a thermoplastic polyisoimide and said cross-linkable oligomer comprises a thermosetting imide or isoimide oligomer having unsaturated terminal groups.

31. An adhesive comprising a solution of a semi-interpenetrating polymer network and a solvent, said semi-interpenetrating polymer network formed by curing a linear polymer combined with a cross-linkable oligomer, wherein said linear polymer comprises a thermoplastic polyisoimide and said cross-linkable oligomer comprises a thermosetting imide or isoimide oligomer having unsaturated terminal groups.

32. The process of claim 1, wherein said unsaturated terminal groups comprise ethylenic or acetylenic groups.

33. The semi-interpenetrating polymer network of claim 14, wherein said unsaturated terminal groups comprise ethylenic or acetylenic groups.

34. The composite of claim 30, wherein said cross-linkable oligomer is an acetylene-terminated isoimide oligomer.

35. The adhesive of claim 31, wherein said cross-linkable oligomer is an acetylene-terminated isoimide oligomer.

36. A process for making a semi-interpenetrating polymer network which comprises heating and curing a mixture of a thermoplastic polyisoimide and a cross-linkable thermosetting imide or isoimide oligomer having unsaturated terminal groups, and converting said polyisoimide to a polyimide and homopolymerizing said imide or isoimide oligomer having unsaturated terminal groups, to form said semi-interpenetrating polymer network.

37. The process of claim 36, wherein said thermosetting oligomer having unsaturated terminal groups is an isoimide.

38. The process of claim 36, wherein said thermosetting oligomer is selected from the group consisting of acetylene-terminated, maleimide-terminated, nadimide-terminated and benzocyclobutene-terminated imide and isoimide oligomers.

39. The process of claim 36, wherein the amount of the polyisoimide ranges from about 10 to about 90%, and the amount of the thermosetting oligomer ranges from about 90 to about 10%, by weight.

* * * * *